US011984132B2

(12) United States Patent
Furuta

(10) Patent No.: US 11,984,132 B2
(45) Date of Patent: May 14, 2024

(54) NOISE SUPPRESSION DEVICE, NOISE SUPPRESSION METHOD, AND STORAGE MEDIUM STORING NOISE SUPPRESSION PROGRAM

(71) Applicant: Mitsubishi Electric Corporation, Tokyo (JP)

(72) Inventor: Satoru Furuta, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 142 days.

(21) Appl. No.: 17/695,419

(22) Filed: Mar. 15, 2022

(65) Prior Publication Data

US 2022/0208206 A1 Jun. 30, 2022

Related U.S. Application Data

(63) Continuation of application No. PCT/JP2019/039797, filed on Oct. 9, 2019.

(51) Int. Cl.
*G10L 21/0224* (2013.01)
*G10L 21/0216* (2013.01)
(Continued)

(52) U.S. Cl.
CPC ........ *G10L 21/0224* (2013.01); *G10L 21/034* (2013.01); *G10L 25/18* (2013.01);
(Continued)

(58) Field of Classification Search
CPC ... G10L 21/0224; G10L 21/034; G10L 25/18; G10L 2021/02166; H04R 3/005;
(Continued)

(56) References Cited

U.S. PATENT DOCUMENTS 7,043,030 B1 * 5/2006 Furuta ................. G10L 21/0208 704/226
8,762,139 B2 * 6/2014 Furuta ..................... G10L 21/02 704/214
(Continued)

FOREIGN PATENT DOCUMENTS

JP 2009-141560 A 6/2009
JP 4912036 B2 4/2012
(Continued)

OTHER PUBLICATIONS

International Search Report for PCT/JP2019/039797 dated Dec. 17, 2019.
(Continued)

*Primary Examiner* — Vivian C Chin
*Assistant Examiner* — Douglas J Suthers
(74) *Attorney, Agent, or Firm* — BIRCH, STEWART, KOLASCH & BIRCH, LLP

(57) ABSTRACT

A noise suppression device transforms observation signals to spectral components of multiple channels, calculates an arrival time difference, calculates weight coefficients based on the arrival time difference, estimates whether each of the spectral components of the plurality of frames is a spectral component of target sound or not, estimates a weighted S/N ratio of each of the spectral components of the plurality of frames based on the result of the estimation and the weight coefficients, calculates gains of the spectral components of the plurality of frames by using the weighted S/N ratios, outputs spectral components of an output signal by suppressing spectral components of observation signals of sounds other than the target sound in the spectral components of the plurality of frames by using the gains, and transforms the spectral components of the output signal to an output signal in a time domain.

7 Claims, 8 Drawing Sheets

(51) Int. Cl.

| | |
|---|---|
| ***G10L 21/034*** | (2013.01) |
| ***G10L 25/18*** | (2013.01) |
| ***H04R 3/00*** | (2006.01) |
| ***H04R 5/027*** | (2006.01) |
| ***H04S 3/00*** | (2006.01) |

(52) U.S. Cl.
CPC ............ *H04R 3/005* (2013.01); *H04R 5/027* (2013.01); *H04S 3/008* (2013.01); *G10L 2021/02166* (2013.01); *H04R 2499/13* (2013.01); *H04S 2400/01* (2013.01); *H04S 2400/15* (2013.01)

(58) Field of Classification Search
CPC . H04R 5/027; H04R 2499/13; H04S 2400/01; H04S 2400/15; H04S 3/008
USPC ........................................................ 381/94.2
See application file for complete search history.

(56) References Cited

U.S. PATENT DOCUMENTS

2003/0128851 A1* 7/2003 Furuta ................ G10L 21/0208 704/226
2004/0102967 A1* 5/2004 Furuta ................ G10L 21/0208 704/226
2007/0274536 A1 11/2007 Matsuo
2012/0099731 A1 4/2012 Hultz et al.
2013/0142343 A1* 6/2013 Matsui .................. G10L 21/028 381/71.1
2014/0098968 A1* 4/2014 Furuta ................ G10L 21/0232 381/71.12

FOREIGN PATENT DOCUMENTS

JP 2013-543988 A 12/2013
WO WO 2012/026126 A1 3/2012
WO WO 2016/136284 A1 9/2016

OTHER PUBLICATIONS

Lotter et al., “Speech Enhancement by MAP Spectral Amplitude Estimation Using a Super-Gaussian Speech Model”, EURASIP Journal on Applied Signal Processing, 2005, No. 7, pp. 1110-1126.
Notice of Reasons for Refusal issued in Japanese Patent Application No. 2020-505925 dated May 26, 2020.
Notice of Reasons for Refusal issued in Japanese Patent Application No. 2020-505925 dated Sep. 29, 2020.
Written Opinion of the International Searching Authority for PCT/JP2019/039797 (PCT/ISA/237) dated Dec. 17, 2019.

* cited by examiner

NOISE SUPPRESSION DEVICE, NOISE SUPPRESSION METHOD, AND STORAGE MEDIUM STORING NOISE SUPPRESSION PROGRAM

CROSS-REFERENCE TO RELATED APPLICATION

This application is a continuation application of International Application No. PCT/JP2019/039797 having an international filing date of Oct. 9, 2019.

BACKGROUND OF THE INVENTION

1. Field of the Invention

The present disclosure relates to a noise suppression device, a noise suppression method and a noise suppression program.

2. Description of the Related Art

With the progress of digital signal processing technology in recent years, there have been widespread a system that enables hands-free voice control in an automobile or a living room of a house, hands-free communication of having a conversation on a mobile phone free-handed, or teleconferencing in a meeting room of a company. There is also being developed a system that detects an abnormal condition of a machine or a human based on information such as abnormal sound of the machine or a scream by the human. In these systems, a microphone is used to collect target sound such as voice or abnormal sound in a variety of noise environment such as in a traveling automobile, a factory, a living room, or a meeting room of a company. However, the microphone collects not only the target sound but also masking sound as sound other than the target sound.

As a method for extracting a target signal based on the target sound from an input signal containing a disturbing signal based on the masking sound, there has been proposed a method of extracting the target sound by suppressing signals of sounds outside an arrival direction range of the target sound by using an arrival time difference as a difference in arrival times of sound arriving at each of a plurality of microphones. See Patent Reference 1 (WO 2016/136284) and Patent Reference 2 (Japanese Patent No. 4912036), for example. Patent Reference 1 discloses a method of extracting the target signal with high accuracy by estimating the arrival direction of the target sound from an input phase difference of signals of the plurality of microphones, generating gain coefficients having directivity, and multiplying input signals by the gain coefficients. Patent Reference 2 discloses a method of increasing the extraction accuracy of the target signal by additionally multiplying noise suppression amounts, separately generated by a noise suppression device, by the gain coefficients.

However, the above-described methods determine the gain coefficients based exclusively on arrival direction information on the target sound, and thus there is a problem in that sound quality of the output signal deteriorates when the arrival direction of the target sound is vague since distortion of the target signal increases and abnormal noise as background noise occurs due to excessive suppression or insufficient erasure occurring to the signals of sounds outside the arrival direction range of the target sound.

SUMMARY OF THE INVENTION

An object of the present disclosure is to provide a noise suppression device, a noise suppression method and a noise suppression program capable of obtaining the target signal with high quality.

A noise suppression device of the present disclosure is a device that regards voices uttered by first and second speakers seated on a driver's seat and a passenger seat in an automobile as target sound, including processing circuitry: to respectively transform observation signals of multiple channels based on observation sounds collected by microphones of the multiple channels to spectral components of the multiple channels as signals in a frequency domain; to calculate an arrival time difference of the observation sounds based on spectral components of a plurality of frames in each of the spectral components of the multiple channels; to estimate whether each of the spectral components of the plurality of frames is a spectral component of the target sound or a spectral component of sound other than the target sound in regard to spectral components of at least one channel among the spectral components of the multiple channels; to calculate weight coefficients of the spectral components of the plurality of frames based on a histogram of the arrival time difference so that the weight coefficient is larger than 1 if the spectral component is a spectral component of sound within an arrival direction range of the target sound and the weight coefficient is smaller than 1 if the spectral component is a spectral component of sound outside the arrival direction range of the target sound, to judge that sounds from a position behind and between the driver's seat and the passenger seat, a window's side of the driver's seat and a window's side of the passenger seat are directional noises from known presumed arrival directions, and to lower the weight coefficients regarding the spectral components in the presumed arrival directions; to estimate a weighted S/N ratio of each of the spectral components of the plurality of frames based on a result of the estimation of the weighted S/N ratio and the weight coefficients; to calculate a gain regarding each of the spectral components of the plurality of frames by using the weighted S/N ratio; to output spectral components of an output signal by suppressing spectral components of observation signals of sounds other than the target sound in the spectral components of the plurality of frames based on at least one channel in the spectral components of the multiple channels by using the gains; and to transform the spectral components of the output signal to an output signal in a time domain.

A noise suppression method of the present disclosure is a method that regards voices uttered by first and second speakers seated on a driver's seat and a passenger seat in an automobile as target sound, including: respectively transforming observation signals of multiple channels based on observation sounds collected by microphones of the multiple channels to spectral components of the multiple channels as signals in a frequency domain; calculating an arrival time difference of the observation sounds based on spectral components of a plurality of frames in each of the spectral components of the multiple channels; estimating whether each of the spectral components of the plurality of frames is a spectral component of the target sound or a spectral component of sound other than the target sound in regard to spectral components of at least one channel among the spectral components of the multiple channels; calculating weight coefficients of the spectral components of the plurality of frames based on a histogram of the arrival time difference so that the weight coefficient is larger than 1 if the spectral component is a spectral component of sound within an arrival direction range of the target sound and the weight coefficient is smaller than 1 if the spectral component is a spectral component of sound outside the arrival direction range of the target sound, judging that sounds from a position behind and between the driver's seat and the passenger seat, a window's side of the driver's seat and a window's side of the passenger seat are directional noises from known presumed arrival directions, and lowering the weight coefficients regarding the spectral components in the presumed arrival directions; estimating a weighted S/N ratio of each of the spectral components of the plurality of frames based on a result of the estimation and the weight coefficients; calculating a gain regarding each of the spectral components of the plurality of frames by using the weighted S/N ratio; outputting spectral components of an output signal by suppressing spectral components of observation signals of sounds other than the target sound in the spectral components of the plurality of frames based on at least one channel in the spectral components of the multiple channels by using the gains; and transforming the spectral components of the output signal to an output signal in a time domain.

According to the present disclosure, the target signal can be obtained with high quality.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Further scope of applicability of the present invention will become apparent from the detailed description given hereinafter. However, it should be understood that the detailed description and specific examples, while indicating preferred embodiments of the invention, are given by way of illustration only, since various changes and modifications will become apparent to those skilled in the art from the detailed description.

Noise suppression devices, noise suppression methods and noise suppression programs according to embodiments will be described below with reference to the drawings. The following embodiments are just examples and a variety of modifications are possible within the scope of the present invention.

(1) First Embodiment

(1-1) Configuration

Figure 1:
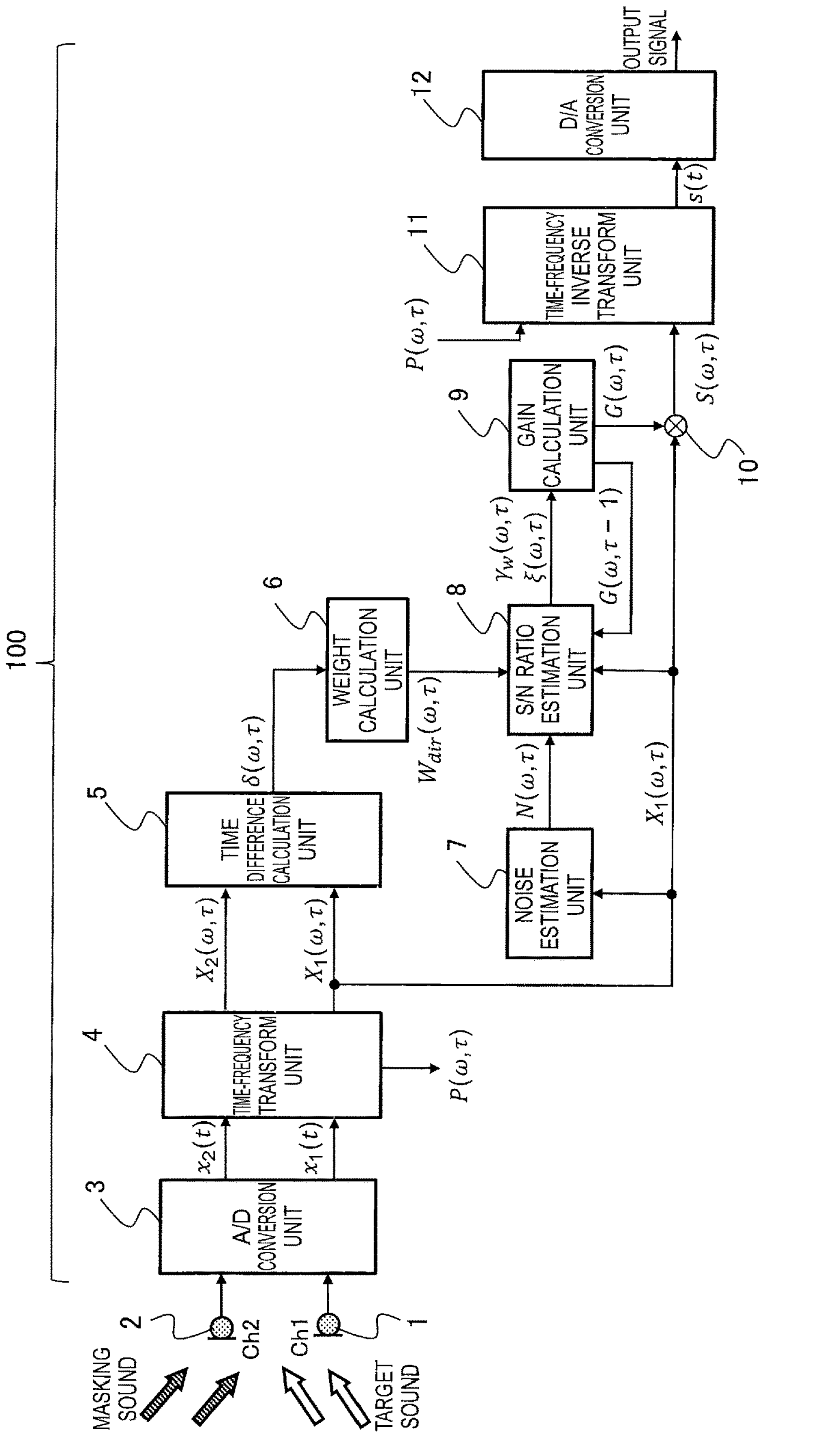
FIG. 1 is a block diagram showing the general configuration of a noise suppression device in a first embodiment.

FIG. 1 is a block diagram showing the general configuration of a noise suppression device 100 in a first embodiment. The noise suppression device 100 is a device capable of executing a noise suppression method in the first embodiment. The noise suppression device 100 includes an analog-to-digital conversion unit (i.e., A/D conversion unit) 3 that receives an input signal (i.e., observation signal) from microphones of multiple channels that collect observation sound, a time-frequency transform unit 4, a time difference calculation unit 5, a weight calculation unit 6, a noise estimation unit 7, an S/N ratio estimation unit 8, a gain calculation unit 9, a filter unit 10, a time-frequency inverse transform unit 11, and a digital-to-analog conversion unit (i.e., D/A conversion unit) 12. In FIG. 1, the microphones of the multiple channels (Ch) are two microphones 1 and 2. The noise suppression device 100 may include the microphones 1 and 2 as parts of the device. Further, the microphones of the multiple channels can also be microphones of three of more channels.

The noise suppression device 100 generates weight coefficients on the basis of an arrival direction of target sound based on observation signals in the frequency domain generated based on signals outputted from the microphones 1 and 2, and generates an output signal, corresponding to the target sound from which noise having directivity has been removed, by using the weight coefficients for gain control of the noise suppression. Incidentally, the microphone 1 is a microphone of Ch 1 and the microphone 2 is a microphone of Ch 2. Further, the arrival direction of the target sound is a direction heading from the sound source of the target sound towards the microphone.

<Microphones 1 and 2>

Figure 2:
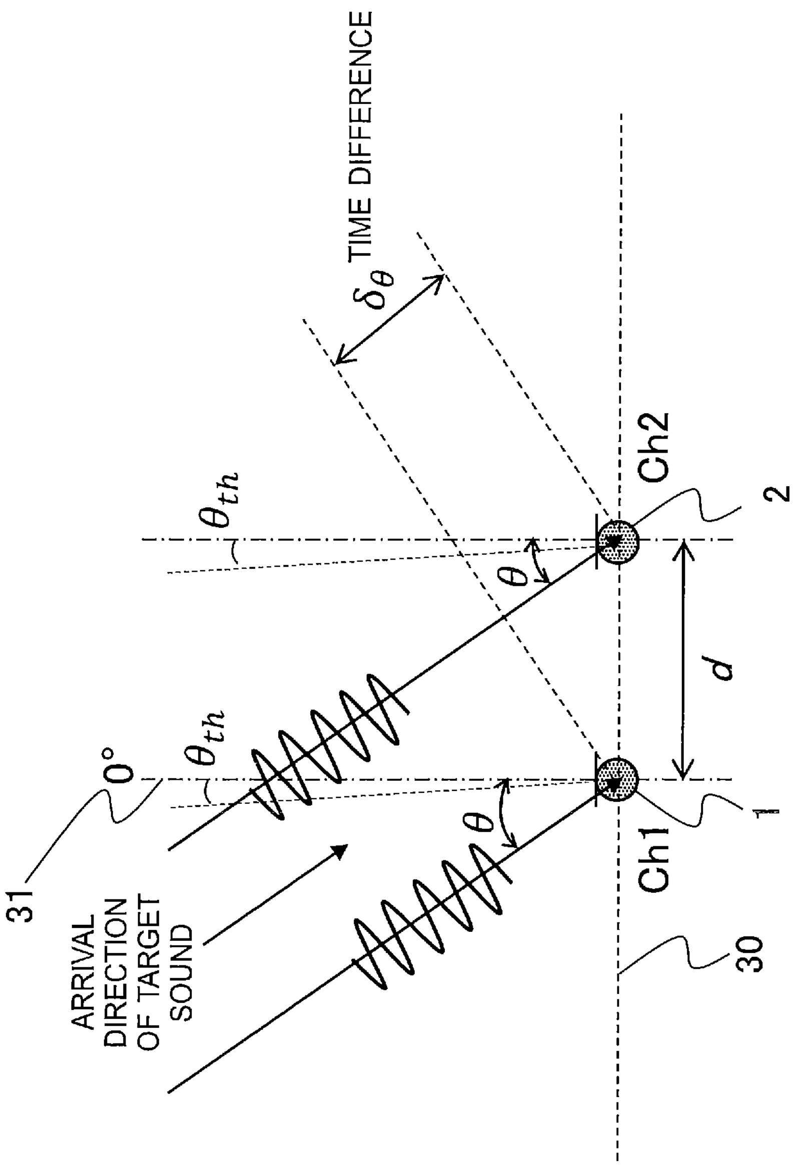
FIG. 2 is a diagram showing a method for estimating an arrival direction of target sound by using an arrival time difference.

FIG. 2 is a diagram showing a method of estimating the arrival direction of the target sound by using an arrival time difference. To facilitate the understanding of the explanation, it is assumed that the microphones 1 and 2 of Ch 1 and Ch 2 are arranged on the same reference plane 30 as shown in FIG. 2 and their positions are known and do not change with time. Further, an arrival direction range of the target sound, as an angular range representing directions from which the target sound can arrive, is also assumed not to change with time. Furthermore, the target sound is assumed to be voice of a single speaker, and masking sound (i.e., noise) is assumed to be general additive noise including voice of another speaker. Incidentally, the arrival time difference is also represented simply as a "time difference".

First, signals outputted from the microphones 1 and 2 of Ch 1 and Ch 2 at time t will be explained below. In this case, let $s_1(t)$ and $s_2(t)$ respectively represent speech signals of Ch 1 and Ch 2 based on the target sound as the voice, $n_1(t)$ and $n_2(t)$ respectively represent additive noise signals of Ch 1 and Ch 2 based on the additive noise as the masking sound, and $x_1(t)$ and $x_2(t)$ respectively represent input signals of Ch 1 and Ch 2 based on the sound as superimposition of the target sound and the additive noise, $x_1(t)$ and $x_2(t)$ are defined as shown in the following expressions (1) and (2):

$$x_1(t)=s_1(t)+n_1(t) \quad (1).$$

$$x_2(t)=s_2(t)+n_2(t) \quad (2).$$

<A/D Conversion Unit 3>

The A/D conversion unit 3 performs analog-to-digital (A/D) conversion on the input signals of Ch 1 and Ch 2 supplied from the microphones 1 and 2. Namely, the A/D conversion unit 3 samples each of the input signals of Ch 1 and Ch 2 at a predetermined sampling frequency (e.g., 16 kHz) while converting the signals to digital signals divided in units of frames (e.g., 16 ms), and outputs the digital signals as observation signals of Ch 1 and Ch 2 at the time t. Incidentally, the observation signals at the time t outputted from the A/D conversion unit 3 are also represented as $x_1(t)$ and $x_2$ (t).

<Time-frequency Transform Unit 4>

The time-frequency transform unit 4 receives the observation signals $x_1(t)$ and $x_2(t)$ of Ch 1 and Ch 2, performs fast Fourier transform of 512 points, for example, on the observation signals $x_1(t)$ and $x_2(t)$, and thereby calculates short-time spectral components $X_1(\omega, \tau)$ of the present frame of Ch 1 and short-time spectral components $X_2(\omega, \tau)$ of the present frame of Ch 2. Here, ω represents a spectrum number as a discrete frequency, and τ represents a frame number. Namely, $X_1(\omega, \tau)$ represents the spectral component of the ω-th frequency domain in the τ-th frame, that is, the spectral component of the τ-th frame in the ω-th frequency domain. Unless otherwise stated, the "short-time spectral components of the present frame" will be described simply as the "spectral components". Further, the time-frequency transform unit 4 outputs phase spectra P(ω, τ) of the input signals to the time-frequency inverse transform unit 11. In short, the time-frequency transform unit 4 transforms the observation signals of two channels based on the observation sounds collected by the microphones 1 and 2 of two channels respectively to the spectral components $X_1(\omega, \tau)$ and $X_2(\omega, \tau)$ of two channels as signals in the frequency domain.

<Time Difference Calculation Unit 5>

The time difference calculation unit 5 receives the spectral components $X_1(\omega, \tau)$ and $X_2(\omega, \tau)$ of Ch 1 and Ch 2 as inputs and calculates the arrival time difference δ(ω, τ) of the observation signals $x_1(t)$ and $x_2(t)$ of Ch 1 and Ch 2 based on the spectral components $X_1(\omega, \tau)$ and $X_2(\omega, \tau)$. Specifically, the time difference calculation unit 5 calculates the arrival time difference δ(ω, τ) of the observation sounds based on spectral components of a plurality of frames in each of the spectral components of two channels. Namely, δ(ω, τ) represents the arrival time difference based on the spectral components of the τ-th frame of the ω-th channel.

For determining the arrival time difference δ(ω, τ), consideration will be given to a case where sound arrives from a sound source situated in a direction at an angle θ from a normal line 31 to the reference plane 30 when the distance between the microphones 1 and 2 of Ch 1 and Ch 2 is d as shown in FIG. 2. The normal line 31 represents a reference direction. In order to identify whether the sound is the target sound or the masking sound, whether the arrival direction of the sound is within a desired range or not is estimated by using the observation signals $x_1(t)$ and $x_2(t)$ of the microphones 1 and 2 of Ch 1 and Ch 2. Since the arrival time difference δ(ω, τ) occurring between the observation signals $x_1(t)$ and $x_2(t)$ of Ch 1 and Ch 2 is determined according to the angle θ representing the arrival direction of the sound, the arrival direction of the sound can be estimated by using the arrival time difference δ(ω, τ).

First, as shown in expression (3), the time difference calculation unit 5 calculates a cross-spectrum D(ω, τ) from a cross-correlation function of the spectral components $X_1(\omega, \tau)$ and $X_2(\omega, \tau)$ of the observation signals $x_1(t)$ and $x_2(t)$.

$$D(\omega,\tau)=X_1(\omega,\tau)\overline{X_2(\omega,\tau)} \quad (3).$$

Subsequently, the time difference calculation unit 5 obtains a phase $\theta_D(\omega, \tau)$ of the cross-spectrum D(ω, τ) according to the following expression (4):

$$\theta_D(\omega, \tau) = \tan^{-1}\left(\frac{Q(\omega, \tau)}{K(\omega, \tau)}\right). \quad (4)$$

Here, Q(ω, τ) and K(ω, τ) respectively represent the imaginary part and the real part of the cross-spectrum D(ω, τ). The phase $\theta_D(\omega, \tau)$ obtained from the expression (4) means the phase angle between the spectral components $X_1(\omega, \tau)$ and $X_2(\omega, \tau)$ of Ch 1 and Ch 2, and a quotient obtained by dividing the phase $\theta_D(\omega, \tau)$ by the discrete frequency ω represents the time delay between the two signals. Thus, the time difference δ(ω, τ) between the observation signals $x_1(t)$ and $x_2(t)$ of Ch 1 and Ch 2 is represented as the following expression (5):

$$\delta(\omega, \tau) = \frac{\theta_D(\omega, \tau)}{\omega}. \quad (5)$$

A theoretical value $\delta_\theta$ of the time difference observed when the sound arrives from the sound source situated in the direction at the angle θ (i.e., theoretical time difference $\delta_\theta$) is represented as the following expression (6) by using the distance d between the microphones 1 and 2 of Ch 1 and Ch 2: Here, c represents the speed of sound.

$$\delta_\theta = \frac{d \sin\theta}{c}. \quad (6)$$

Assuming that a set of angles θ satisfying $\theta > \theta_{th}$ is the desired direction range, whether the sound is arriving from a sound source situated within the desired direction range or not can be estimated based on a comparison result obtained by comparing the theoretical value $\delta_{\theta_{th}}$ of the time difference observed when the sound arrives from the sound source situated in the direction at the angle $\theta_{th}$(i.e., theoretical time difference $\delta_{\theta_{th}}$) with the time difference δ(ω, τ) between the observation signals $x_1(t)$ and $x_2(t)$ of Ch 1 and Ch 2.

<Weight Calculation Unit 6>

Figure 3:
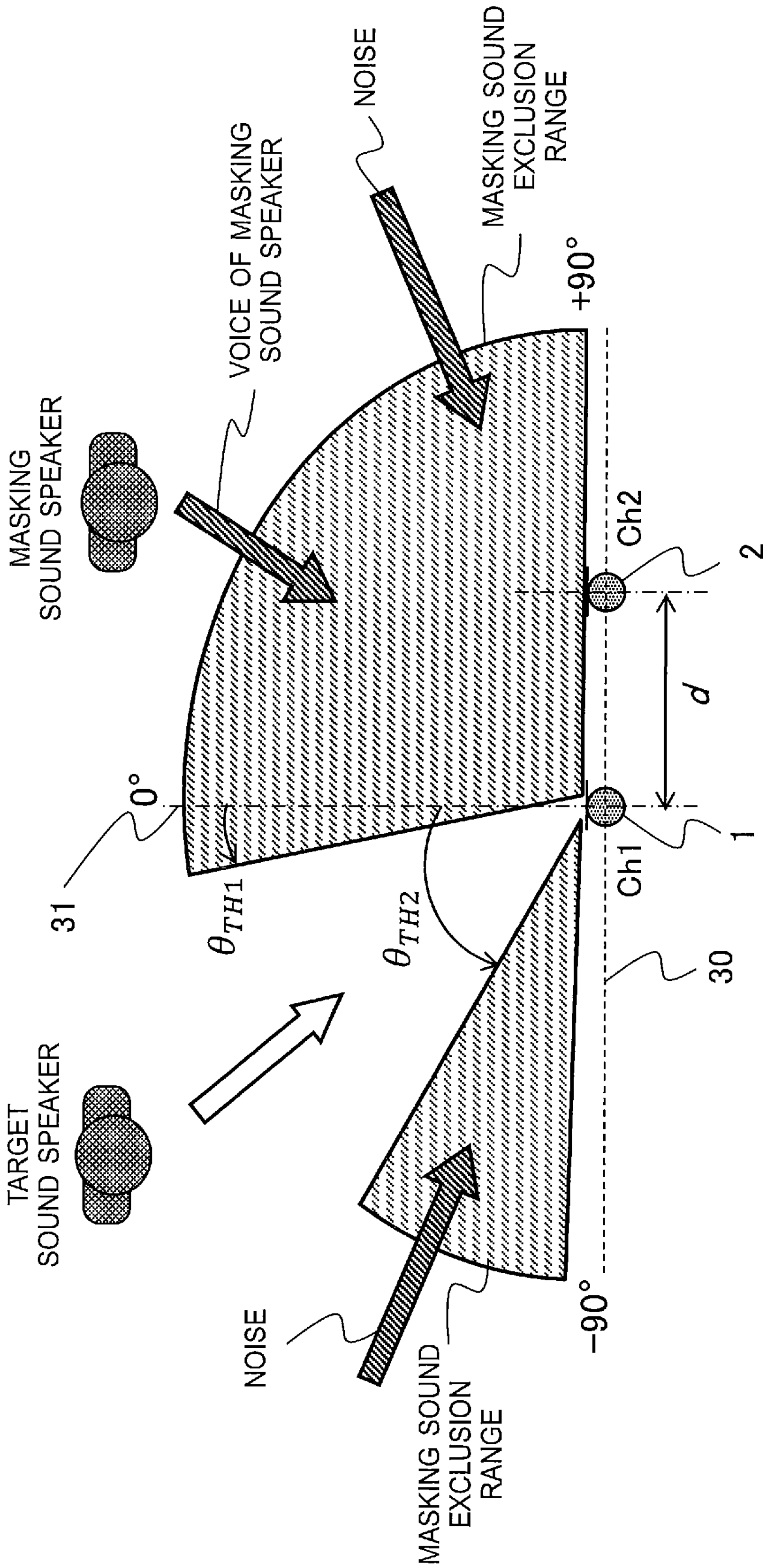
FIG. 3 is a diagram schematically showing an example of an arrival direction range of the target sound.

FIG. 3 is a diagram schematically showing an example of the arrival direction range of the target sound. By using the time difference δ(ω, τ) outputted from the time difference calculation unit 5, the weight calculation unit 6 calculates a weight coefficient $W_{dir}(\omega, \tau)$ of the arrival direction range of the target sound, for weighting an estimate value of the S/N ratio (i.e., signal-to-noise ratio) which will be described later, by using expression (7), for example. Namely, the weight calculation unit 6 calculates the weight coefficient ($W_{dir}(\omega, \tau)$) of each of the spectral components of the plurality of frames based on the arrival time difference δ(ω, τ). Here, angles $\theta_{TH1}$ and $\theta_{TH2}$ representing threshold values (i.e., boundary angles) of the arrival direction range of the target sound can be set by defining the angular range representing the arrival direction range of the speech of the speaker of the target sound as the range between the angles $\theta_{TH1}$ and $\theta_{TH2}$ as shown in FIG. 3 and converting the angular range to the time difference by using the aforementioned expression (5).

$$W_{dir}(\omega,\tau)=\begin{cases}1.0, & \delta_{\theta TH1}>\delta(\omega,\tau)>\delta_{\theta TH2}\\ w_{dir}(\omega), & \text{otherwise}\end{cases}. \quad (7)$$

The terms $\delta_{\theta_{TH1}}$ and $\delta_{\theta_{TH2}}$ respectively represent theoretical values of the time difference observed when the sound arrives from the sound source situated in the direction at the angle $\theta_{TH1}$ or $\theta_{TH2}$ (i.e., theoretical time differences). Suitable examples of the angles $\theta_{TH1}$ and $\theta_{TH2}$ are $\theta_{TH1}=-10°$ and $\theta_{TH2}=-40°$.

Further, the weight $w_{dir}(\omega)$ is a constant determined to take on a value within $0\le w_{dir}(\omega)\le 1$, and the S/N ratio is estimated lower with the decrease in the value of the weight $w_{dir}(\omega)$. Thus, signals of sounds outside the arrival direction range of the target sound strongly undergo the amplitude suppression; however, it is also possible to change the value of the weight $w_{dir}(\omega)$ for each spectral component as shown in expression (8). In the example of the expression (8), the value of $w_{dir}(\omega)$ is set so as to increase with the increase in the frequency. This is for reducing the influence of spatial aliasing (i.e., phenomenon in which an error occurs to the arrival direction of the target sound). Distortion of the target signal due to the influence of the spatial aliasing can be inhibited since the weights in a high-frequency range are lessened by performing frequency correction of the weight coefficients.

$$w_{dir}(\omega)=0.1+\frac{0.2\cdot\omega}{N},\ \omega=1,2,\ldots,N. \quad (8)$$

Here, N represents the total number of discrete frequency spectra and N=256, for example. The weight $w_{dir}(\omega)$ shown in the expression (8) is corrected so that its value increases (i.e., approaches 1) with the increase in the discrete frequency ω. However, the weight $w_{dir}(\omega)$ is not limited to the values of the expression (8) but can be changed properly depending on the characteristics of the observation signals $x_1(t)$ and $x_2(t)$. For example, in a case where an acoustic signal as the object of the disturbing signal suppression is a signal based on speech, by making correction so as to weaken the suppression of formants as frequency range components important in speech while making correction so as to strengthen the suppression of the other frequency range components, the accuracy of suppression control in regard to voice being the disturbing signal increases and efficiently suppressing the disturbing signal becomes possible. Further, in a case where the acoustic signal as the object of the disturbing signal suppression is a signal based on noise due to a steady operation of a machine, a signal based on music, or the like, efficiently suppressing the disturbing signal becomes possible by setting frequency ranges in which the suppression is strengthened and frequency ranges in which the suppression is weakened depending on the frequency characteristic of the acoustic signal.

While the aforementioned expression (7) prescribes the weight coefficient $W_{dir}(\omega,\tau)$ of the arrival direction range of the target sound by using the time difference $\delta(\omega,\tau)$ of the observation signals of the present frame, the calculation formula of the weight coefficient $W_{dir}(\omega,\tau)$ is not limited to this example. For example, it is also possible to use a value $\bar{\delta}(\omega,\tau)$ obtained by taking the average of the time difference $\delta(\omega,\tau)$ in the frequency direction as shown in expression (9), obtain a value $\delta_{ave}(\omega,\tau)$ by taking the average of $\bar{\delta}(\omega,\tau)$ in the time direction as shown in expression (10), and replace $\delta(\omega,\tau)$ in the expression (7) with $\delta_{ave}(\omega,\tau)$.

$$\bar{\delta}(\omega,\tau)=\frac{\delta(\omega-1,\tau)+\delta(\omega,\tau)+\delta(\omega+1,\tau)}{3},\ \omega=2,\ldots,N-1. \quad (9)$$

$$\delta_{ave}(\omega,\tau)=\frac{\bar{\delta}(\omega,\tau)+\bar{\delta}(\omega,\tau-1)+\bar{\delta}(\omega,\tau-2)}{3}. \quad (10)$$

Namely, $\delta_{ave}(\omega,\tau)$ is the average value of the time difference taken for the present frame and past two frames at the time difference between adjoining spectral components, and the following expression (11) can be obtained by replacing $\delta(\omega,\tau)$ in the expression (7) with $\delta_{ave}(\omega,\tau)$:

$$W_{dir}(\omega,\tau)=\begin{cases}1.0, & \delta_{\theta TH1}>\delta_{ave}(\omega,\tau)>\delta_{\theta TH2}\\ w_{dir}(\omega), & \text{otherwise}\end{cases}. \quad (11)$$

Since the sound field environment changes dynamically due to movement of the speaker and sources of noises and the like, the arrival direction and the time difference of the observation sound also change dynamically. Therefore, the time difference can be stabilized by using the average value $\delta_{ave}(\omega,\tau)$ of the time difference as shown in the expression (11). Accordingly, stabilized weight coefficients $W_{dir}(\omega,\tau)$ can be obtained and noise suppression with high accuracy can be executed.

Further, while adjoining spectral components are used in the expression (9) for obtaining the average in the frequency direction, the method of calculating the average in the frequency direction is not limited to this example. The method of calculating the average in the frequency direction can be changed properly depending on the modes of the target signal and the disturbing signal and the mode of the sound field environment. Furthermore, while spectral components regarding past three frames are used in the expression (10) for obtaining the average in the time direction, the method of calculating the average in the time direction is not limited to this example. The method of calculating the average in the time direction can be changed properly depending on the modes of the target signal and the disturbing signal and the mode of the sound field environment.

While a case where the position where the target sound is generated (i.e., the position of the sound source) or the arrival direction of the target sound is known has been described in the above example of FIG. 3, the first embodiment is not limited to such cases. The device in the first embodiment can be employed also in a case where the arrival direction of the target sound is unknown due to movement of the target sound generation position or the like. For example, it is possible to calculate a histogram of the time difference of the observation sound that is estimated to be the target signal based on the target sound in regard to past M frames (e.g., M=50) and assign weight to a certain angular range around the mode or average of the histogram as the center line, such as an angular range of +(plus) 15° to −(minus) 15° with reference to the mode or average, as the arrival direction range of the target sound. Namely, when the mode is −30°, it is possible to assign weight to an angular range from $\theta_{TH1}$=−15° to $\theta_{TH2}$=−45° as the arrival direction range of the target sound.

In the case where the arrival direction of the target sound is unknown, the weighting of the S/N ratio becomes possible by prescribing the arrival direction range of the target sound based on the histogram of the time difference of the target signal and it becomes possible to execute the noise suppression with high accuracy even when the target sound generation position moves.

Further, in the aforementioned expression (7), when 6(6), T) satisfies $\delta_{\theta_{TH1}}>\delta(\omega,\tau)>\delta_{\theta_{TH2}}$, that is, when the target sound exists in a predetermined arrival direction range, the value of the weight coefficient $W_{dir}(\omega, \tau)$ is set at 1.0 and no change is made to the value of the S/N ratio. However, the value of the weight coefficient $W_{dir}(\omega, \tau)$ is not limited to the aforementioned example. For example, the value of the weight coefficient $W_{dir}(\omega, \tau)$ can be set at a predetermined positive value greater than 1.0 (e.g., 1.2). By chancing the weight coefficient $W_{dir}(\omega, \tau)$ in the arrival direction range of the target sound to a positive value greater than 1.0, the S/N ratio of the target signal spectrum is estimated high, and thus the amplitude suppression of the target signal becomes weak, excessive suppression of the target signal can be inhibited, and executing high-quality noise suppression becomes possible. This predetermined positive value can also be changed properly depending on the modes of the target signal and the disturbing signal and the mode of the sound field environment, such as changing the value for each spectral component similarly to the way shown in the expression (8).

Incidentally, the constant values (e.g., 1.0, 1.2, etc.) of the weight coefficients $W_{dir}(\omega, \tau)$ mentioned above are not limited to the aforementioned values. The constant values can be adjusted properly to suit the modes of the target signal and the disturbing signal. Further, the condition for the arrival direction range of the target sound is also not limited to two levels as in the expression (7). The condition for the arrival direction range of the target sound may be set by use of a greater number of levels such as in a case where there are two or more target signals.

Next, a noise suppression process will be described below. The spectral components $X_1(\omega, \tau)$ of the input signal $x_1(t)$ can be represented as in the following expressions (12) and (13) according to the definition in the expression (1): Incidentally, while the subscript "1" can be left out in the following description, each signal is assumed to represent a signal of Ch 1 unless otherwise noted.

$$X(\omega,\tau)=S(\omega,\tau)+N(\omega,\tau) \quad (12).$$

$$S=\Re[S]+j\Im[S], N=\Re[N]+j\Im[N] \quad (13).$$

In the expression (12), $S(\omega, \tau)$ represents the spectral components of the speech signal and $N(\omega, \tau)$ represents the spectral components of the noise signal. The expression (13) is an expression representing the spectral components $S(\omega, \tau)$ of the speech signal and the spectral components $N(\omega, \tau)$ of the noise signal in the complex number representation. The spectrum of the input signal can be represented as in the following expression (14):

$$R(\omega,\tau)e^{jP(\omega,\tau)}=A(\omega,\tau)e^{j\alpha(\omega,\tau)}+Z(\omega,\tau)e^{j\beta(\omega,\tau)} \quad (14).$$

Here, $R(\omega, \tau)$, $A(\omega, \tau)$ and $Z(\omega, \tau)$ respectively represent the amplitude spectra of the input signal, the speech signal and the noise signal. Similarly, $P(\omega, \tau)$, $a(\omega, \tau)$ and $\beta(\omega, \tau)$ respectively represent the phase spectra of the input signal, the speech signal and the noise signal.

<Noise Estimation Unit 7>

The noise estimation unit 7 judges whether the spectral component $X_1(\omega, \tau)$ of the input signal of the present frame is speech (i.e., "X=Speech") or noise (i.e., "X=Noise"), and when the judgment is noise, updates the spectral component of the noise signal according to expression (15) and outputs the updated spectral component as an estimate value $\hat{N}(\omega, \tau)$ of the spectral component of the noise signal. Specifically, in regard to the spectral components of at least one channel among the spectral components of the multiple channels, the noise estimation unit 7 estimates whether each of the spectral components of the plurality of frames is a spectral component of the target sound or a spectral component of sound other than the target sound.

When the present frame is speech, the result of the update in the previous frame is directly outputted as an estimate noise spectral component of the present frame as in the case of "if X=Speech" in the following expression (15): Incidentally, $\hat{N}(\omega,\tau-1)$ represents an average value obtained from spectral components of the input signal of the previous frame that are judged as noise.

$$\hat{N}^2(\omega,\tau)=\begin{cases}0.98\cdot\hat{N}^2(\omega,\tau-1)+0.02\cdot|X(\omega,\tau)|^2, & \text{if } X=\text{Noise},\\ \hat{N}^2(\omega,\tau-1), & \text{if } X=\text{Speech}.\end{cases} \quad (15)$$

<S/N Ratio Estimation Unit 8>

Based on the results $N(\omega, \tau)$ of the estimation by the noise estimation unit 7 and the weight coefficients $W_{dir}(\omega, \tau)$, the S/N ratio estimation unit 8 estimates the weighted S/N ratio of each of the spectral components of the plurality of frames in the spectral components of Ch 1. Specifically, the S/N ratio estimation unit 8 calculates estimate values of an a priori S/N ratio (a priori SNR) and an a posteriori S/N ratio (a posteriori SNR) based on the spectral components $X(\omega, \tau)$ of the input signal, the spectral components $\hat{N}(\omega, \tau)$ of the noise signal, and the following expressions (16) and (17):

$$\hat{\xi}(\omega,\tau)=\frac{E[\hat{A}^2(\omega,\tau)]}{N^2(\omega,\tau)}. \quad (16)$$

$$\hat{\gamma}(\omega,\tau)=\frac{R^2(\omega,\tau)}{N^2(\omega,\tau)}. \quad (17)$$

Here, $\xi(\omega, \tau)$, $\hat{\gamma}(\omega, \tau)$, and $\hat{A}^2(\omega, \tau)$ respectively represent the estimate value of the a priori S/N ratio, the estimate value of the a posteriori S/N ratio and the estimate value of the speech signal, and $E[\cdot]$ represents an expectation value.

The a posteriori S/N ratio is obtained from the following expression (18) by using the spectral components $X_1(\omega, \tau)$ of the input signal and the spectral components $\hat{N}^2(\omega, \tau)$ of the noise signal: In the expression (18), the a posteriori S/N ratio weighted by using the weight coefficient $W_{dir}(\omega, \tau)$ of the arrival direction range of the target sound obtained from the aforementioned expression (7), that is, a weighted a posteriori S/N ratio $\hat{\gamma}_w(\omega, \tau)$, is shown.

$$\hat{\gamma}_w(\omega,\tau)=W_{dir}(\omega,\tau)\cdot\frac{|X(\omega,\tau)|^2}{\hat{N}^2(\omega,\tau)}. \quad (18)$$

The a priori S/N ratio $\xi(\omega, \tau)$ is obtained recursively by using the following expressions (19) and (20) since the expectation value $E[\hat{A}^2(\omega, \tau)]$ cannot be directly obtained:

$$\hat{\xi}(\omega, \tau) = \delta \cdot \frac{\hat{A}^2(\omega, \tau-1)}{N^2(\omega, \tau)} + (1-\delta) \cdot F[\hat{\gamma}_w(\omega, \tau) - 1] = \delta \cdot G^2(\omega, \tau-1) \cdot \hat{\gamma}_w(\omega, \tau-1) + (1-\delta) \cdot F[\hat{\gamma}_w(\omega, \tau) - 1]. \quad (19)$$

$$F[x] = \begin{cases} x, & x > 0 \\ 0, & \text{otherwise} \end{cases}. \quad (20)$$

Here, $\delta$ is a forgetting coefficient having a value satisfying $0<\delta<1$ and is set at $\delta=0.98$ in the first embodiment. $G(\omega, \tau)$ represents a spectrum suppression gain which will be described later.

<Gain Calculation Unit 9>

The gain calculation unit 9 calculates the gain $G(\omega, \tau)$ for each of the spectral components of the plurality of frames by using the weighted S/N ratio. Specifically, the gain calculation unit 9 obtains the gain $G(\omega, \tau)$ for the spectrum suppression as a noise suppression amount in regard to each spectral component by using the a priori S/N ratio $\xi(\omega, \tau)$ and the weighted a posteriori S/N ratio $\hat{\gamma}_w(\omega, \tau)$ outputted from the S/N ratio estimation unit 8.

Here, as the method for obtaining the gain $G(\omega, \tau)$, the joint MAP method can be used, for example. The joint MAP method is a method of estimating the gain $G(\omega, \tau)$ on the assumption that the noise signal and the speech signal satisfy Gaussian distribution. In this method, by using the a priori S/N ratio $\xi(\omega, \tau)$ and the weighted a posteriori S/N ratio $\hat{\gamma}_w(\omega, \tau)$, an amplitude spectrum and a phase spectrum maximizing a conditional probability density function are obtained and their values are used as estimate values. The spectrum suppression amount can be represented by the following expressions (21) and (22) by using $\upsilon$ and $\mu$ determining the shape of the probability density function as parameters:

$$G(\omega, \tau) = u(\omega, \tau) + \sqrt{u^2(\omega, \tau) + \frac{v}{2\hat{\gamma}_w(\omega, \tau)}}. \quad (21)$$

$$u(\omega, \tau) = \frac{1}{2} - \frac{\mu}{4 \cdot \sqrt{\hat{\gamma}_w(\omega, \tau) \cdot \hat{\xi}(\omega, \tau)}}. \quad (22)$$

The method for deriving the spectrum suppression amount by the joint MAP method is already known, and is described in Non-patent Reference 1, for example.

Non-patent Reference 1 is T. Lotter and another, "Speech Enhancement by MAP Spectral Amplitude Estimation Using a Super-Gaussian Speech Model", EURASIP Journal on Applied Signal Processing, pp. 1110-1126, No. 7, 2005.

By obtaining the gain for the spectrum suppression according to the probability density function after assigning the weight of the arrival direction range of the target sound to the S/N ratio estimate values as described above, the error of the arrival direction of the sound is lessened even when the arrival direction is vague, and thus it becomes possible to obtain the spectrum suppression gain with which the deterioration of the target signal and the occurrence of the abnormal noise are slight and the excessive suppression and the insufficient erasure of the disturbing signals outside the arrival direction range of the sound are slight in comparison with the conventional method of directly obtaining the spectrum suppression gain.

<Filter Unit 10>

The filter unit 10 outputs spectral components of the output signal by suppressing spectral components of observation signals of sounds other than the target sound in the spectral components $X(\omega, \tau)$ of the plurality of frames based on at least one channel in the spectral components of the multiple channels by using the gains G. In the first embodiment, the spectral components $X(\omega, \tau)$ of at least one channel in the spectral components of the multiple channels are the spectral components $X_1(\omega, \tau)$ of one channel. Specifically, the filter unit 10 obtains a noise-suppressed speech spectral component $\hat{S}(\omega, \tau)$ by multiplying the spectral component $X(\omega, \tau)$ of the input signal by the gain $G(\omega, \tau)$ as shown in the following expression (23) and outputs the noise-suppressed speech spectral component $\hat{S}(\omega, \tau)$ to the time-frequency inverse transform unit 11.

$$\hat{S}(\omega,\tau)=G(\omega,\tau)\cdot X(\omega,\tau) \quad (23).$$

<Time-frequency Inverse Transform Unit 11>

The time-frequency inverse transform unit 11 obtains an acoustic signal, in which the noise has been suppressed and the target signal has been extracted, by transforming the obtained estimate speech spectral components $\hat{S}(\omega, \tau)$, together with the phase spectrum $P(\omega, \tau)$ outputted from the time-frequency transform unit 4, to a temporal signal by means of inverse fast Fourier transform, for example, performing overlap addition with the speech signal of the previous frame, and outputting a final output signal $\hat{s}(t)$.

<D/A Conversion Unit 12>

Thereafter, the D/A conversion unit 12 converts the output signal $\hat{s}(t)$ to an analog signal and outputs the analog signal to an external device. The external device is, for example, a speech recognition device, a hands-free communication device, a teleconferencing device, an abnormality monitoring device that detects an abnormal condition of a machine or a human based on information such as abnormal sound of the machine or a scream by the human, or the like.

(1-2) Operation

Figure 4:
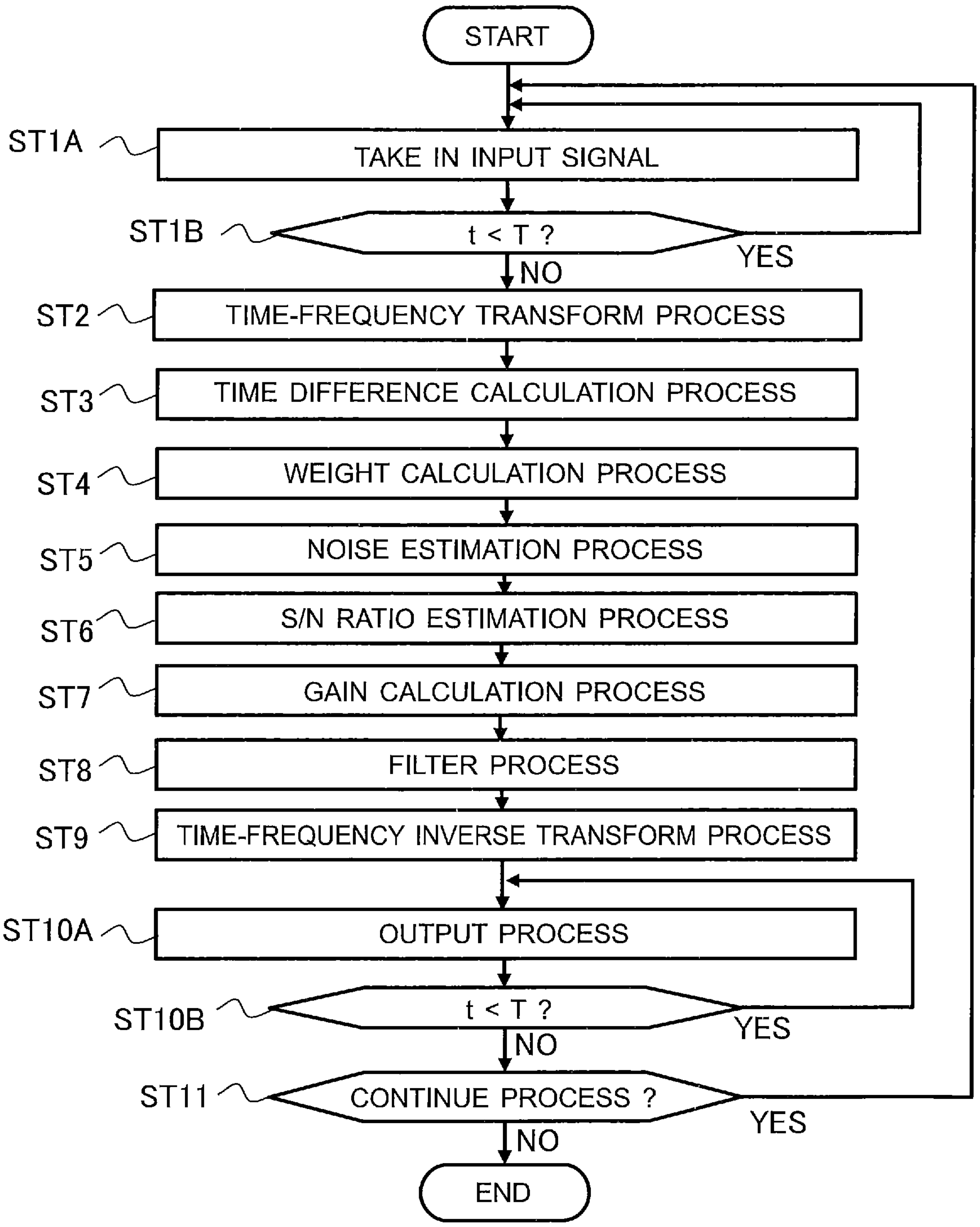
FIG. 4 is a flowchart showing the operation of the noise suppression device in the first embodiment.

Next, the operation of the noise suppression device 100 in the first embodiment will be described below. FIG. 4 is a flowchart showing an example of the operation of the noise suppression device 100. The A/D conversion unit 3 takes in the two observation signals, inputted from the microphones 1 and 2, at predetermined frame intervals (step ST1A), and outputs the acquired observation signals to the time-frequency transform unit 4. When a sample number (i.e., numerical value corresponding to the time) t is smaller than a predetermined value T (YES in step ST1B), the process of the step ST1A is repeated until t reaches T. T is 256, for example.

The time-frequency transform unit 4 receives the observation signals $x_1(t)$ and $x_2(t)$ of the microphones 1 and 2 of Ch 1 and Ch 2 as inputs, performs fast Fourier transform of 512 points, for example, and thereby calculates the spectral components $X_1(\omega, \tau)$ and $X_2(\omega, \tau)$ of Ch 1 and Ch 2 (step ST2).

The time difference calculation unit 5 receives the spectral components $X_1(\omega, \tau)$ and $X_2(\omega, \tau)$ of Ch 1 and Ch 2 as inputs and calculates the time difference $\delta(\omega, \tau)$ of the observation signals of Ch 1 and Ch 2 (step ST3).

The weight calculation unit 6 calculates the weight coefficient $W_{dir}(\omega, \tau)$ of the arrival direction range of the target sound, for weighting the S/N ratio estimate values, by using the time difference $\delta(\omega, \tau)$ of the observation signals outputted from the time difference calculation unit 5 (step ST4).

The noise estimation unit 7 judges whether the spectral component $X_1(\omega, \tau)$ of the input signal of the present frame is a spectral component of an input signal of speech or a spectral component of an input signal of noise, and when the judgment is noise, updates the estimate noise spectral component $\hat{N}(\omega, \tau)$ by using the spectral component of the input signal of the present frame, and outputs the updated estimate noise spectral component (step ST5).

The S/N ratio estimation unit 8 calculates the estimate values of the a priori S/N ratio and the a posteriori S/N ratio by using the spectral component $X(\omega, \tau)$ of the input signal and the estimate noise spectral component $\hat{N}(\omega, \tau)$ (step ST6).

The gain calculation unit 9 calculates the gain $G(\omega, \tau)$ as the noise suppression amount in regard to each spectral component by using the a priori S/N ratio $\hat{\xi}(\omega, \tau)$ and the weighted a posteriori S/N ratio $\hat{\gamma}_w(\omega, \tau)$ outputted from the S/N ratio estimation unit 8 (step ST7).

The filter unit 10 multiplies the spectral components $X(\omega, \tau)$ of the input signal respectively by the gains $G(\omega, \tau)$ and thereby outputs the noise-suppressed speech spectrum $\hat{S}(\omega, \tau)$ (step ST8).

The time-frequency inverse transform unit 11 performs inverse fast Fourier transform on the spectral components $\hat{S}(\omega, \tau)$ of the output signal and thereby transforms the signal to an output signal $\hat{s}(t)$ in the time domain (step ST9).

The D/A conversion unit 12 executes a process of converting the obtained output signal to an analog signal and outputting the analog signal to the outside (step ST10A), and when t representing the sample number is smaller than T being the predetermined value (YES in step ST10B), repeats the process of the step ST10A until t reaches T.

When the noise suppression process is continued after the step ST10B (YES in step ST11), the process returns to the step ST1A. In contrast, when the noise suppression process is not continued (NO in the step ST11), the noise suppression process ends.

(1-3) Hardware Configuration

The components of the noise suppression device 100 shown in FIG. 1 can be implemented by a computer as an information processing device including a CPU (Central Processing Unit). The computer including the CPU is, for example, a portable computer such as a smartphone or a tablet-type computer, a microcomputer to be embedded in equipment for a system such as a car navigation system or a teleconferencing system, an SoC (System on Chip), or the like.

The components of the noise suppression device 100 shown in FIG. 1 may also be implemented by processing circuitry such as an LSI (Large Scale Integrated circuit), a DSP (Digital Signal Processor), an ASIC (Application Specific Integrated Circuit), FPGA (Field-Programmable Gate Array) or the like. Further, the components of the noise suppression device 100 shown in FIG. 1 can also be a combination of a computer and an LSI.

Figure 5:
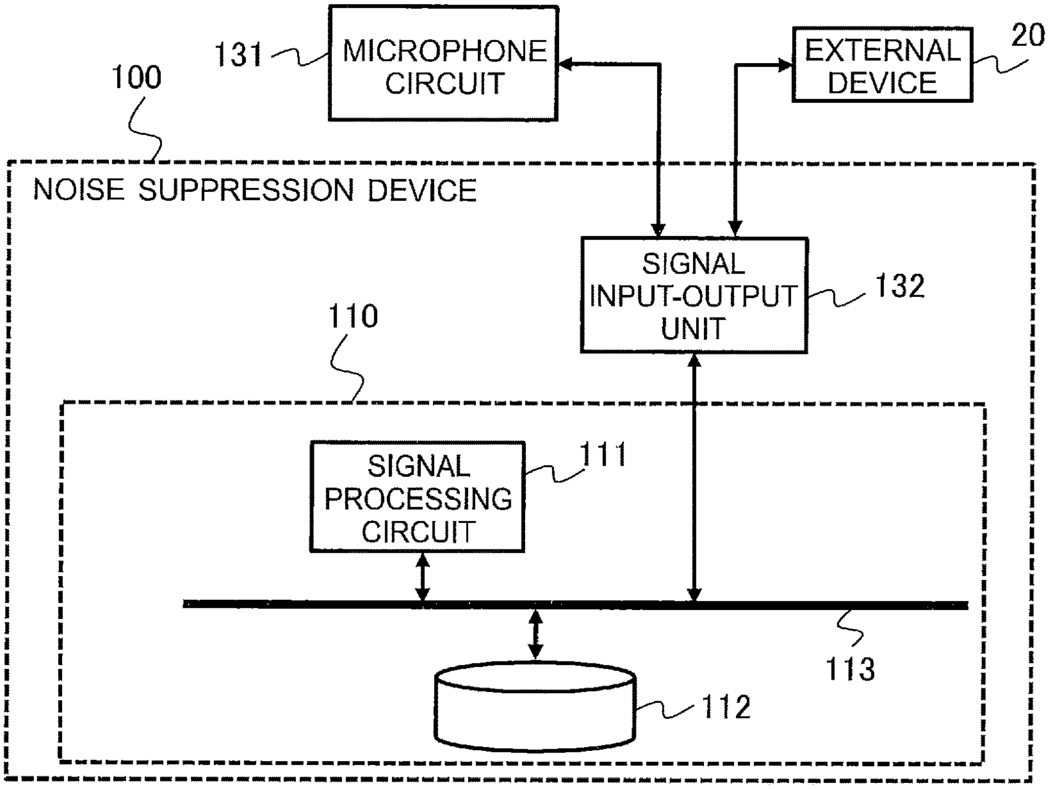
FIG. 5 is a block diagram showing an example of the hardware configuration of the noise suppression device in the first embodiment.

FIG. 5 is a block diagram showing an example of the hardware configuration of the noise suppression device 100 famed by using an LSI such as a DSP, an ASIC or an FPGA. In the example of FIG. 5, the noise suppression device 100 includes a signal input-output unit 132, a signal processing circuit 111, a record medium 112, and a signal path 113 such as a bus. The signal input-output unit 132 is an interface circuit that implements a function of making connection with a microphone circuit 131 and an external device 20. The microphone circuit 131 includes, for example, a circuit that transduces acoustic vibration of the microphones 1 and 2 or the like to electric signals.

The configurations of the time-frequency transform unit 4, the time difference calculation unit 5, the weight calculation unit 6, the noise estimation unit 7, the S/N ratio estimation unit 8, the gain calculation unit 9, the filter unit 10 and the time-frequency inverse transform unit 11 shown in FIG. 1 can be implemented by a control circuit 110 including the signal processing circuit 111 and the record medium 112. Further, the A/D conversion unit 3 and the D/A conversion unit 12 in FIG. 1 correspond to the signal input-output unit 132.

The record medium 112 is used for accumulating various types of data such as signal data and various setting data of the signal processing circuit 111. As the record medium 112, a volatile memory such as an SDRAM (Synchronous DRAM) or a volatile memory such as an HDD (Hard Disk Drive) or an SSD (Solid State Drive) can be used, for example. The record medium 112 stores, for example, initial state data and various setting data of the noise suppression process, constant data for control, and so forth.

The target signal after undergoing the noise suppression process by the signal processing circuit 111 is sent out to the external device 20 via the signal input-output unit 132. The external device 20 is a speech recognition device, a hands-free communication device, a teleconferencing device, an abnormality monitoring device or the like, for example.

Figure 6:
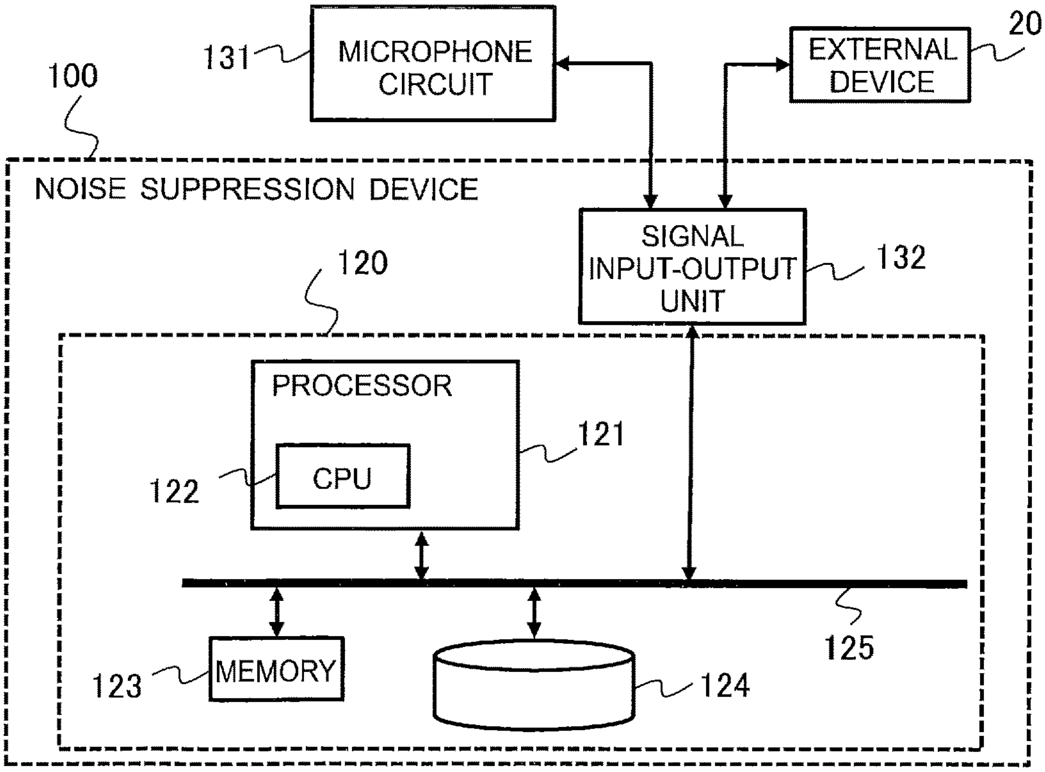
FIG. 6 is a block diagram showing another example of the hardware configuration of the noise suppression device in the first embodiment.

On the other hand, FIG. 6 is a block diagram showing an example of the hardware configuration of the noise suppression device 100 formed by using an arithmetic device such as a computer. In the example of FIG. 6, the noise suppression device 100 includes the signal input-output unit 132, a processor 121 including a CPU 122, a memory 123, a record medium 124, and a signal path 125 such as a bus. Processing circuit 120 is formed by the processor 121, the memory 123, the record medium 124, and the signal path 125. The signal input-output unit 132 is an interface circuit that implements the function of making connection with the microphone circuit 131 and the external device 20.

The memory 123 is a storage device such as a program memory that stores various programs for implementing the noise suppression process in the first embodiment, a work memory that is used by the processor when executing data processing, a ROM (Read Only Memory) and a RAM (Random Access Memory) used as memories for spreading the signal data or the like, and so forth.

The functions of the time-frequency transform unit 4, the time difference calculation unit 5, the weight calculation unit 6, the noise estimation unit 7, the S/N ratio estimation unit 8, the gain calculation unit 9, the filter unit 10 and the time-frequency inverse transform unit 11 shown in FIG. 1 can be implemented by the processor 121, the memory 123 and the record medium 124. Further, the A/D conversion unit 3 and the D/A conversion unit 12 in FIG. 1 correspond to the signal input-output unit 132.

The record medium 124 is used for accumulating various types of data such as signal data and various setting data of the processor 121. As the record medium 124, a volatile memory such as an SDRAM or a volatile memory such as an HDD or an SSD can be used, for example. The record medium 124 can accumulate programs including an OS (Operating System) and various types of data such as various setting data and acoustic signal data. Incidentally, this record medium 124 can also be used to accumulate the data stored in the memory 123.

The processor 121 is capable of executing the noise suppression process of the time-frequency transform unit 4, the time difference calculation unit 5, the weight calculation unit 6, the noise estimation unit 7, the S/N ratio estimation unit 8, the gain calculation unit 9, the filter unit 10 and the time-frequency inverse transform unit 11 by using the RAM in the memory 123 as a working memory and operating according to a computer program (i.e., noise suppression program) read out from the ROM in the memory 123.

The target signal after undergoing the noise suppression process by the processor 121 is sent out to the external device 20 via the signal input-output unit 132. This external device 20 corresponds to a speech recognition device, a hands-free communication device, a teleconferencing device or an abnormality monitoring device, for example.

The program for executing the noise suppression device 100 may be either stored in a storage device in the computer executing a software program or held in an external storage medium such as a CD-ROM or a flash memory in a format for distribution and loaded in and made to operate at the startup of the computer. In other words, the noise suppression program may be stored in a non-transitory computer-readable storage medium (i.e., recording medium). It is also possible to acquire the program from another computer through a wireless or wired network such as a LAN (Local Area Network). Also in regard to the microphone circuit 131 and the external device 20 connected to the noise suppression device 100, it is also possible to transmit and receive various types of data directly as digital signals through a wireless or wired network not via the analog-to-digital conversion or the like.

Further, the program for executing the noise suppression device 100 may be either combined as software with a program executed in the external device 20 such as a program for executing a speech recognition device, a hands-free communication device, a teleconferencing device or an abnormality monitoring device and made to operate on the same computer, or processed distributedly on a plurality of computers.

Since the noise suppression device 100 is configured as described above, the target signal can be obtained accurately even when the arrival direction of the target sound is vague. Further, the excessive suppression and the insufficient erasure do not occur to signals of sounds outside the arrival direction range of the target sound. Accordingly, it becomes possible to provide a high-accuracy speech recognition device, a high-quality hands-free communication device, a high-quality teleconferencing device and an abnormality monitoring device with high detection accuracy.

(1-4) Effect

As described above, with the noise suppression device 100 in the first embodiment, a high-accuracy noise suppression process for separating the disturbing signal based on the masking sound and the target signal based on the target sound can be executed and the target signal can be extracted with high accuracy while inhibiting the occurrence of the distortion of the target signal and the abnormal noise. Accordingly, it becomes possible to provide high-accuracy speech recognition, high-quality hands-free communication, high-quality teleconferencing and abnormality monitoring with high detection accuracy.

(2) Second Embodiment

In the first embodiment, a description is given of an example of performing the noise suppression process on the input signal from one microphone 1. In a second embodiment, a description will be given of an example of performing the noise suppression process on the input signals from two microphones 1 and 2.

Figure 7:
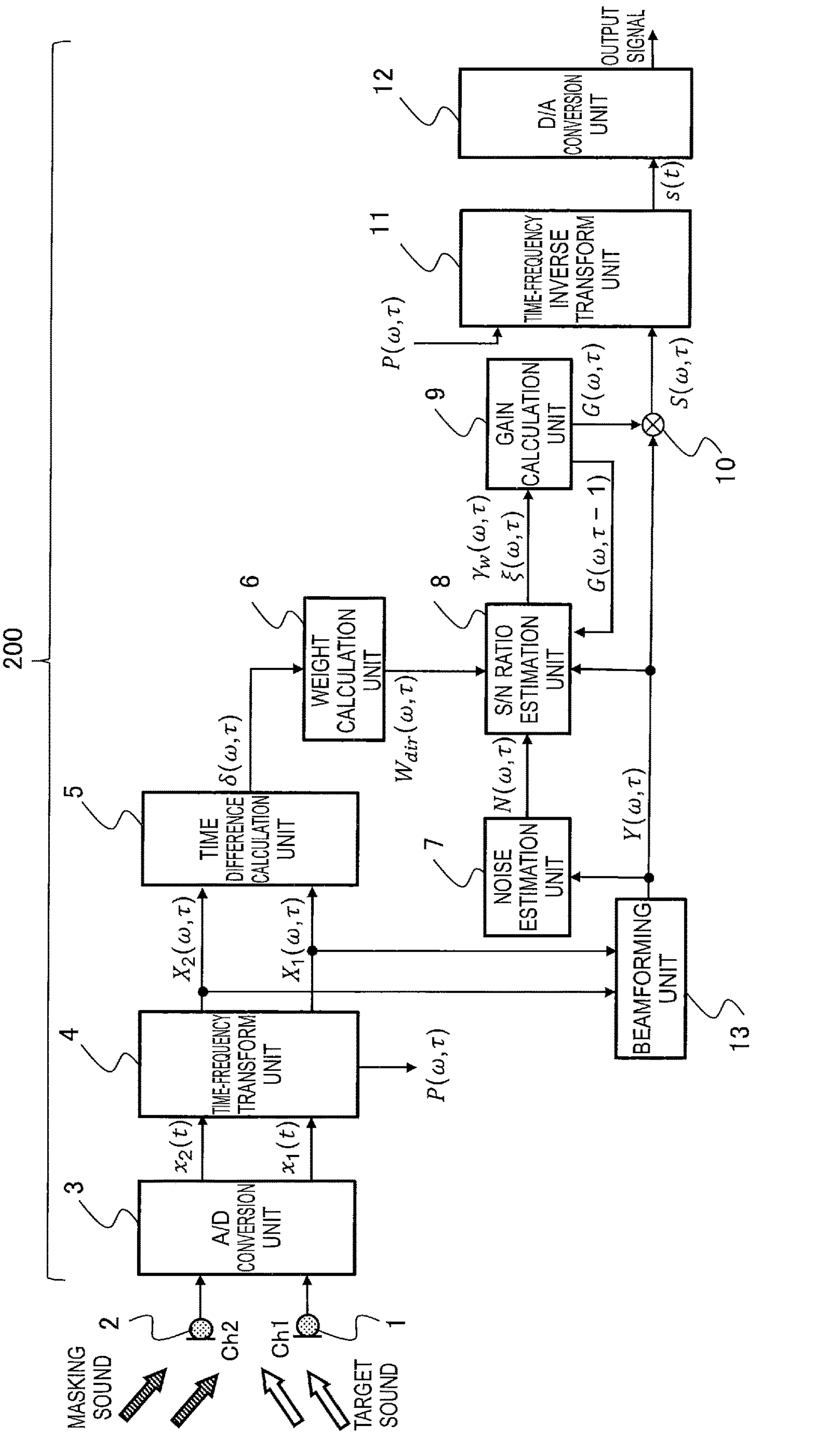
FIG. 7 is a block diagram showing the general configuration of a noise suppression device in a second embodiment.

FIG. 7 is a block diagram showing the general configuration of a noise suppression device 200 in the second embodiment. In FIG. 7, each component identical or corresponding to a component shown in FIG. 1 is assigned the same reference character as in FIG. 1. The noise suppression device 200 in the second embodiment differs from the noise suppression device 100 in the first embodiment in including a beamforming unit 13. Incidentally, the hardware configuration of the noise suppression device 200 in the second embodiment is the same as that shown in FIG. 5 or FIG. 6.

The beamforming unit 13 receives the spectral components $X_1(\omega, \tau)$ and $X_2(\omega, \tau)$ of Ch 1 and Ch 2 as inputs and generates spectral components $Y(\omega, \tau)$ of signals in which the target signal has been emphasized, by executing a process of performing directivity enhancement on the target signal or a process of setting a dead zone to the disturbing signal.

As a method for controlling the directivity of collecting sound by a plurality of microphones, the beamforming unit 13 can use various publicly known methods such as a fixed beamforming process like delay and sum beamforming and filter and sum beamforming and an adaptive beamforming process like MVDR (Minimum Variance Distortionless Response) beamforming.

The noise estimation unit 7, the S/N ratio estimation unit 8 and the filter unit 10 receive the spectral components $Y(\omega, \tau)$, as an output signal from the beamforming unit 13, as inputs instead of the spectral components $X_1(\omega, \tau)$ of the input signal in the first embodiment, and execute their respective processes.

By the combination with the beamforming process executed by the beamforming unit 13 as shown in FIG. 7, the influence of the noise can be reduced further and the extraction accuracy of the target signal increases. Accordingly, it becomes possible to provide still higher noise suppression performance.

Since the noise suppression device 200 in the second embodiment is configured as described above, the influence of the noise can be further eliminated previously by the beamforming. Accordingly, by use of the noise suppression device 200 in the second embodiment, it becomes possible to provide a speech recognition device having a high-accuracy speech recognition function, a hands-free communication device having a high-quality hands-free operation function, and an abnormality monitoring device capable of detecting abnormal sound in an automobile with high accuracy.

(3) Third Embodiment

In the first embodiment, a description is given of an example in which the target sound emitted from the target sound speaker and the masking sound emitted from the masking sound speaker are inputted to the microphones 1 and 2 of Ch 1 and Ch 2. In a third embodiment, a description will be given of an example in which target sounds emitted from speakers and masking sounds as directional noises are inputted to the microphones 1 and 2 of Ch 1 and Ch 2.

Figure 8:
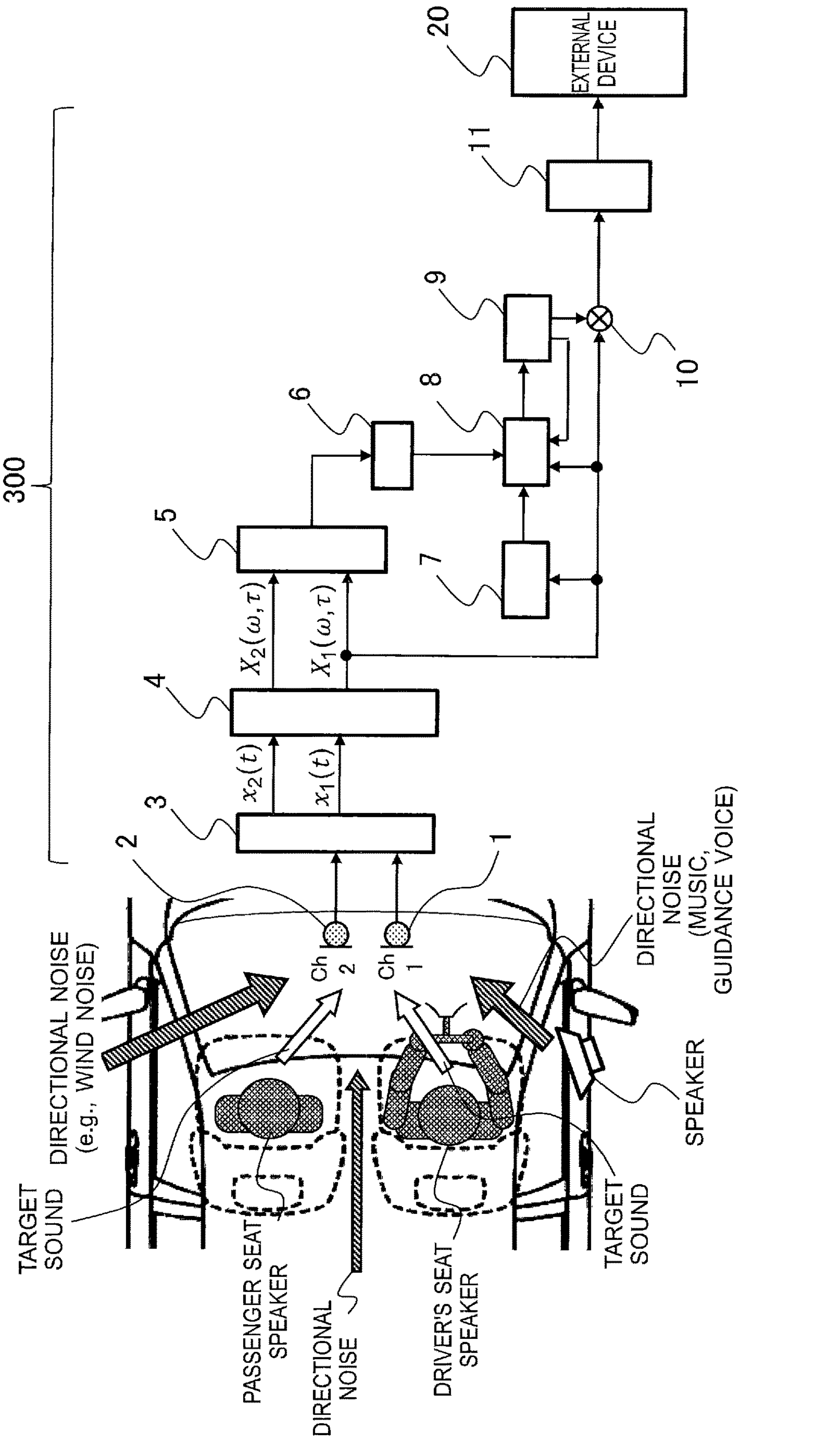
FIG. 8 is a diagram showing the general configuration of a noise suppression device in a third embodiment.

FIG. 8 is a diagram showing the general configuration of a noise suppression device 300 in the third embodiment. In FIG. 8, each component identical or corresponding to a component shown in FIG. 1 is assigned the same reference character as in FIG. 1. The noise suppression device 300 in the third embodiment has been installed in a car navigation system. FIG. 8 shows a case where a speaker seated on the driver's seat in a traveling automobile (driver's seat speaker) and a speaker seated on the passenger seat (passenger seat speaker) are speaking. In FIG. 8, voices uttered by the driver's seat speaker and the passenger seat speaker are the target sound.

The noise suppression device 300 in the third embodiment differs from the noise suppression device 100 in the first embodiment shown in FIG. 1 in that the noise suppression device 300 is connected to the external device 20. In regard to the rest of the configuration, the third embodiment is the same as the first embodiment.

Figure 9:
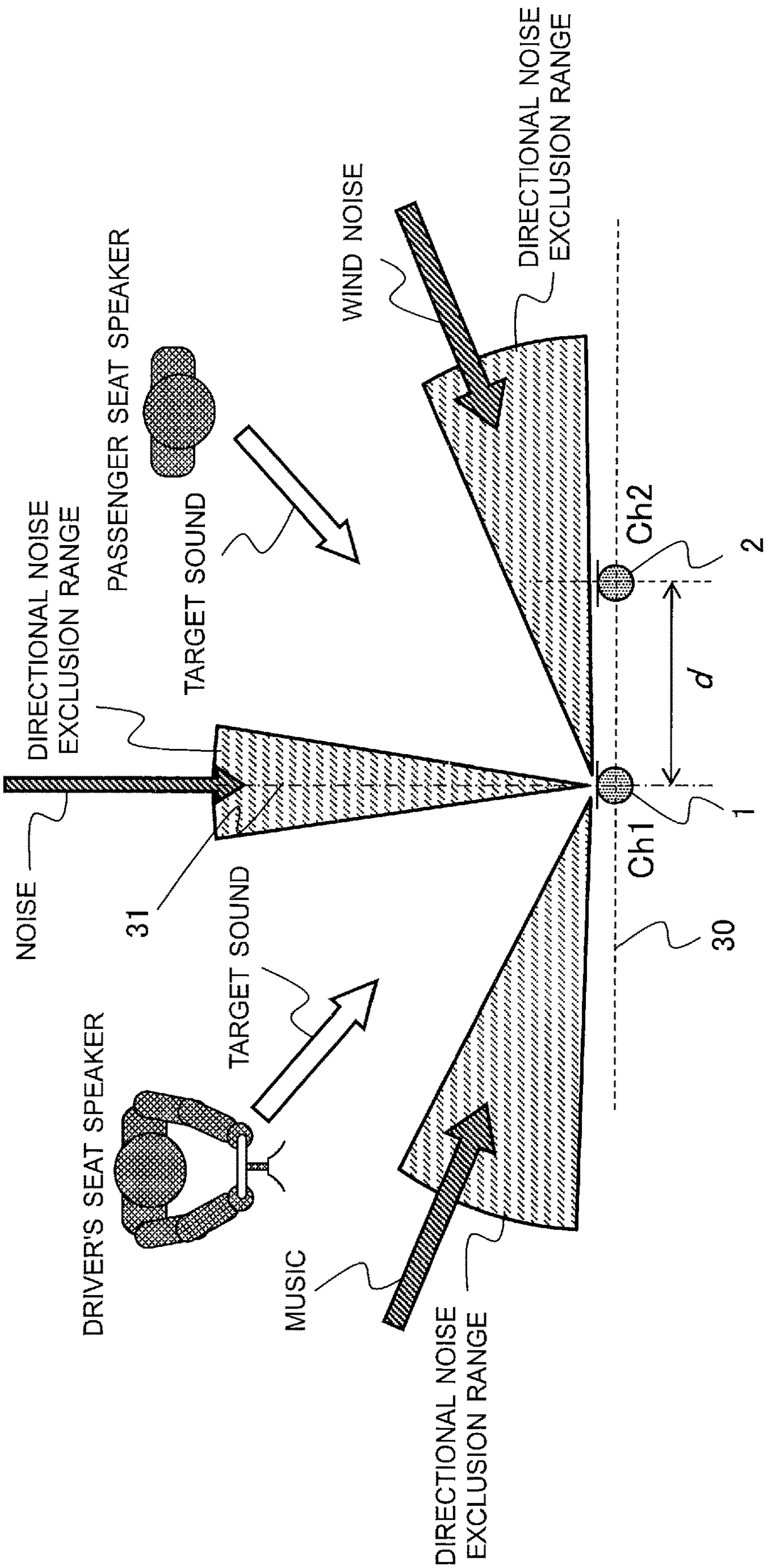
FIG. 9 is a diagram schematically showing an example of the arrival direction range of the target sound in an automobile.

FIG. 9 is a diagram schematically showing an example of the arrival direction range of the target sound in the automobile. In the input signals to the noise suppression device 300, the sound taken in through the microphones 1 and 2 of Ch 1 and Ch 2 includes target sound based on the voices of the speakers and masking sound. The masking sound can include noise such as noise due to the traveling of the automobile, received voice of a far end-side speaker outputted from an audio speaker at the time of hands-free communication, guidance voice outputted from the car navigation system, music played back by car audio equipment, and so forth. The microphones 1 and 2 of Ch 1 and Ch 2 are mounted on a part of a dashboard between the driver's seat and the passenger seat, for example.

The A/D conversion unit 3, the time-frequency transform unit 4, the time difference calculation unit 5, the noise estimation unit 7, the S/N ratio estimation unit 8, the gain calculation unit 9, the filter unit 10 and the time-frequency inverse transform unit 11 are the same as those described in detail in the first embodiment. The noise suppression device 300 in the third embodiment sends out the output signal to the external device 20. The external device 20 executes a speech recognition process, a hands-free communication process or an abnormal sound detection process, for example, and performs an operation corresponding to the result of the process.

The weight calculation unit 6 assumes that noise arrives from the front direction, for example, as shown in FIG. 9 and calculates the weight coefficients so as to lower the S/N ratio of directional noise arriving from the front. Further, the weight calculation unit 6 judges that observation sounds from directions deviating from arrival directions in which the driver's seat speaker and the passenger seat speaker are presumed to be seated as shown in FIG. 9 are directional noises such as wind noise entering through a window and music emitted from an audio speaker, and calculates the weight coefficients so as to lower the S/N ratios of the directional noises.

Since the noise suppression device 300 in the third embodiment is configured as described above, the target signal based on the target sound can be obtained accurately even when the arrival direction of the target sound is unclear. Further, with the noise suppression device 300, the excessive suppression and the insufficient erasure do not occur to signals of sounds outside the arrival direction range of the target sound. Thus, with the noise suppression device 300 in the third embodiment, the target signal based on the target sound can be obtained accurately even when there are various noises in the automobile. Accordingly, by use of the noise suppression device 300 in the third embodiment, it becomes possible to provide a speech recognition device having a high-accuracy speech recognition function, a hands-free communication device having a high-quality hands-free operation function, and an abnormality monitoring device capable of detecting abnormal sound in an automobile with high accuracy.

While a case where the noise suppression device 300 is installed in a car navigation system has been described in the above example, the noise suppression device 300 is applicable also to devices other than car navigation systems. For example, the noise suppression device 300 is applicable also to a remote speech recognition device of a Smart speaker, a television set or the like installed in ordinary households and offices, a videoconferencing system having a voice amplification communication function, a speech recognition dialog system of a robot, an abnormal sound monitoring system of a factory, and so forth. The system employing the noise suppression device 300 also achieves an effect of suppressing noises and acoustic echoes occurring in an acoustic environment like that described above.

(4) Modification

While the case of using the joint MAP method (maximum a posteriori probability method) as the method of noise suppression is described in the first to third embodiments, it is also possible to use a different publicly known method as the method of noise suppression. For example, an MMSE-STSA method (minimum mean square error short-time spectral amplitude method) described in Non-patent Reference 2 or the like can be used as the method of noise suppression.

Non-patent Reference 2 is Y. Ephraim and another, "Speech Enhancement Using a Minimum Mean Square Error Short-Time Spectral Amplitude Estimator", IEEE Trans. ASSP, vol. ASSP-32 No. 6, December 1984.

While an example in which two microphones are arranged on the reference plane 30 is described in the first to third embodiments, the number and the arrangement of the microphones are not limited to this example. For example, in the first to third embodiments, it is also possible to employ a two-dimensional arrangement of arranging four microphones respectively at the apices of a square, a three-dimensional arrangement of arranging four microphones respectively at the apices of a regular tetrahedron or arranging eight microphones respectively at the apices of a regular hexahedron (cube), and so forth. In such a case, the arrival direction range is set based on the number and the arrangement of the microphones.

Further, while an example in which the frequency bandwidth of the input signal is 16 kHz is described in the first to third embodiments, the frequency bandwidth of the input signal is not limited to this example. For example, the frequency bandwidth of the input signal can be a wider bandwidth such as 24 kHz. Furthermore, in the first to third embodiments, there is no limitation on the type of the microphones 1 and 2. For example, the microphones 1 and 2 can be either omnidirectional microphones or microphones having directivity.

It is possible to appropriately combine the configurations of the noise suppression devices according to the first to third embodiments.

The noise suppression devices according to the first to third embodiments hardly cause an abnormal noise signal due to the noise suppression process and are capable of extracting the target signal with little deterioration due to the noise suppression process. Therefore, the noise suppression devices according to the first to third embodiments can be used for increasing the recognition rate of a speech recognition system for remote voice control in a car navigation system, a television set or the like and for quality improvement of a hands-free communication system in a mobile phone, an interphone or the like, a videoconferencing system, an abnormality monitoring system, and so forth.

DESCRIPTION OF REFERENCE CHARACTERS

1, 2: microphone, 3: analog-to-digital conversion unit, 4: time-frequency transform unit, 5: time difference calculation unit, 6: weight calculation unit, 7: noise estimation unit, 8: S/N ratio estimation unit, 9: gain calculation unit, 10: filter unit, 11: time-frequency inverse transform unit, 12: digital-to-analog conversion unit, 13: beamforming unit, 20: external device, 30: reference plane, 31: normal line, 100, 200, 300: noise suppression device.

What is claimed is:

1. A noise suppression device that regards voices uttered by first and second speakers seated on a driver's seat and a passenger seat respectively in an automobile as target sound, comprising processing circuitry:

to respectively transform first and second observation signals of first and second channels based on observation sounds collected by microphones of the first and second channels to first and second spectral components of the first and second channels as signals in a frequency domain;

to calculate an arrival time difference of the observation sounds based on the first and second spectral components of a plurality of frames for each of the first and second spectral components of the first and second channels;

when at least one of the first and second spectral components is set as a target spectral component, to estimate whether the target spectral component of the plurality of frames is a spectral component of the target sound or a spectral component of sound other than the target sound;

to calculate a weight coefficient of the target spectral component of the plurality of frames based on a histogram of the arrival time difference so that the weight coefficient is larger than 1 if the target spectral component is a spectral component of sound within an arrival direction range of the target sound and the weight coefficient is smaller than 1 if the target spectral component is a spectral component of sound outside the arrival direction range of the target sound, and to judge that sounds from a position behind and between the driver's seat and the passenger seat, a window's side of the driver's seat and a window's side of the passenger seat are directional noises from known presumed arrival directions, thereby lowering the weight coefficients regarding the target spectral component in the presumed arrival directions;

to estimate a weighted signal-to-noise ratio of the target spectral component of the plurality of frames based on a result of estimation of a signal-to-noise ratio and the weight coefficients;

to calculate a gain regarding the target spectral component of the plurality of frames by using the weighted signal-to-noise ratio;

to output spectral components of an output signal by suppressing spectral components of first and second observation signals of sounds other than the target sound in the target spectral component of the plurality of frames based on at least one channel in the first and second spectral components by using the gains; and to transform the spectral components of the output signal to an output signal in a time domain.

2. The noise suppression device according to claim 1, wherein the spectral components of at least one channel are spectral components of one channel among the spectral components of the first and second channels, and the processing circuitry estimates whether each of the spectral components of the plurality of frames is a spectral component of the target sound or a spectral component of sound other than the target sound in regard to the spectral components of the one channel.

3. The noise suppression device according to claim 1, wherein the processing circuitry controls directivity of collecting sound by the microphones of the first and second channels based on the spectral components of the first and second channels, estimates whether each of the spectral components of the plurality of frames whose directivity of the collecting sound is controlled is a spectral component of the target sound or a spectral component of sound other than the target sound, thereby outputting a result of noise estimation, estimates the weighted signal-to-noise ratio of each of the spectral components of the plurality of frames whose directivity of the collecting sound is controlled based on the result of the noise estimation and the weight coefficients, calculates the gain regarding each of the spectral components of the plurality of frames by using the weighted signal-to-noise ratio, and outputs the spectral components of the output signal by suppressing the spectral components of the observation signals of the sounds other than the target sound in the spectral components of the plurality of frames whose directivity of the collecting sound is controlled by using the gains.

4. The noise suppression device according to claim 1, wherein the processing circuitry sets the weight coefficient of the spectral component of the sound outside the arrival direction range of the target sound so that the weight coefficient increases with an increase in frequency.

5. The noise suppression device according to claim 4, wherein the arrival direction range is a range within a predetermined angle from a center line representing an arrival direction that is estimated to have a highest possibility of being an arrival direction of the target sound.

6. A noise suppression method that regards voices uttered by first and second speakers seated on a driver's seat and a passenger seat respectively in an automobile as target sound, comprising:

respectively transforming first and second observation signals of first and second channels based on observation sounds collected by microphones of the first and second channels to first and second spectral components of the first and second channels as signals in a frequency domain;

calculating an arrival time difference of the observation sounds based on the first and second spectral components of a plurality of frames for each of the first and second spectral components of the first and second channels;

when at least one of the first and second spectral components is set as a target spectral component, estimating whether the target spectral component of the plurality of frames is a spectral component of the target sound or a spectral component of sound other than the target sound;

calculating a weight coefficient of the target spectral component of the plurality of frames based on a histogram of the arrival time difference so that the weight coefficient is larger than 1 if the target spectral component is a spectral component of sound within an arrival direction range of the target sound and the weight coefficient is smaller than 1 if the target spectral component is a spectral component of sound outside the arrival direction range of the target sound, and judging that sounds from a position behind and between the driver's seat and the passenger seat, a window's side of the driver's seat and a window's side of the passenger seat are directional noises from known presumed arrival directions, thereby lowering the weight coefficients regarding the target spectral component in the presumed arrival directions;

estimating a weighted signal-to-noise ratio the target spectral component of the plurality of frames based on a result of the estimation of a signal-to-noise ratio and the weight coefficients;

calculating a gain regarding the target spectral component of the plurality of frames by using the weighted signal-to-noise ratio;

outputting spectral components of an output signal by suppressing spectral components of first and second observation signals of sounds other than the target sound in the target spectral component of the plurality of frames based on at least one channel in the first and second spectral components by using the gains; and transforming the spectral components of the output signal to an output signal in a time domain.

7. A non-transitory computer-readable storage medium for storing a noise suppression program that causes a computer to execute a noise suppression process that regards voices uttered by first and second speakers seated on a driver's seat and a passenger seat respectively in an automobile as target sound, wherein the noise suppression program causes the computer to execute:

respectively transforming first and second observation signals of first and second channels based on observation sounds collected by microphones of the first and second channels to first and second spectral components of the first and second channels as signals in a frequency domain;

calculating an arrival time difference of the observation sounds based on the first and second spectral components of a plurality of frames for each of the first and second spectral components of the first and second channels;

when at least one of the first and second spectral components is set as a target spectral component, estimating whether the target spectral component of the plurality of frames is a spectral component of the target sound or a spectral component of sound other than the target sound;

calculating a weight coefficient of the target spectral component of the plurality of frames based on a histogram of the arrival time difference so that the weight coefficient is larger than 1 if the target spectral component is a spectral component of sound within an arrival direction range of the target sound and the weight coefficient is smaller than 1 if the target spectral component is a spectral component of sound outside the arrival direction range of the target sound, and judging that sounds from a position behind and between the driver's seat and the passenger seat, a window's side of the driver's seat and a window's side of the passenger seat are directional noises from known presumed arrival directions, thereby lowering the weight coefficients regarding the target spectral component in the presumed arrival directions;

estimating a weighted signal-to-noise ratio of the target spectral component of the plurality of frames based on a result of estimation of a signal-to-noise ratio and the weight coefficients;

calculating a gain regarding the target spectral component of the plurality of frames by using the weighted signal-to-noise ratio;

outputting spectral components of an output signal by suppressing spectral components of first and second observation signals of sounds other than the target sound in the target spectral component of the plurality of frames based on at least one channel in the first and second spectral components by using the gains; and transforming the spectral components of the output signal to an output signal in a time domain.

* * * * *